(12) United States Patent
Kawakami et al.

(10) Patent No.: US 7,596,604 B2
(45) Date of Patent: Sep. 29, 2009

(54) EMAIL INFORMATION PROVIDING SERVER, EMAIL INFORMATION PROVIDING SYSTEM, EMAIL INFORMATION PROVIDING METHOD AND EMAIL INFORMATION PROVIDING PROGRAM

(75) Inventors: Nobuo Kawakami, Tokyo (JP); Masato Horinouchi, Tokyo (JP); Kazuo Hayakawa, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 928 days.

(21) Appl. No.: 11/239,134

(22) Filed: Sep. 30, 2005

(65) Prior Publication Data

US 2007/0083598 A1 Apr. 12, 2007

(30) Foreign Application Priority Data

Sep. 27, 2005 (JP) .............................. 2005-280640

(51) Int. Cl.
*G06F 15/16* (2006.01)
(52) U.S. Cl. ..................................................... 709/206
(58) Field of Classification Search .................. 709/206
See application file for complete search history.

(56) References Cited

U.S. PATENT DOCUMENTS

2005/0176425 A1 8/2005 Kawakami et al.

FOREIGN PATENT DOCUMENTS

| JP | 8-336029 | 12/1996 |
|---|---|---|
| JP | 2000-29869 | 1/2000 |
| JP | 2003-76711 | 3/2003 |
| JP | 2003-296278 | 10/2003 |
| JP | 2004-173116 | 6/2004 |
| JP | 2005-251144 | 9/2005 |

OTHER PUBLICATIONS

English Language abstract of JP 2000-29869.
English Language abstract of JP 2004-173116.
English Language abstract of JP 2005-251144.

(Continued)

*Primary Examiner*—Vivek Srivastava
*Assistant Examiner*—Bryan Lee
(74) *Attorney, Agent, or Firm*—Greenblum & Bernstein P.L.C.

(57) ABSTRACT

The objective of the present invention is to easily acquire necessary information at arbitrary times. According to this invention, folder names that indicate directories are correlated with IDs, and are hierarchically managed in accordance with the correlated IDs; upon receiving an access email from a cellular phone, the folder names correlated with the IDs are examined, and a reply email that includes a folder name included in a first rank and a folder name included in a second rank immediately below the folder name is generated; the reply email is transmitted to the cellular phone at an accessing source; upon receiving an access email from the cellular phone, it is determined whether the email includes the folder name in the second rank that is included in the reply email; when it is determined that the email includes the folder name, the folder names correlated with the IDs are examined, and a reply email that includes a folder name in the second rank and a folder name in a third rank immediately below the folder name is generated; and the reply email is transmitted to the cellular phone at the access source.

8 Claims, 12 Drawing Sheets

OTHER PUBLICATIONS

U.S. Appl. No. 11/239,090 to Kawakami et al., which was filed Sep. 30, 2005.
U.S. Appl. No. 11/239,089 to Kawakami et al., which was filed Sep. 30, 2005.
U.S. Appl. No. 11/239,091 to Kawakami et al., which was filed Sep. 30, 2005.
U.S. Appl. No. 11/239,126 to Kawakami et al., which was filed Sep. 30, 2005.

FIG. 4

| FOLDER id | UPPER FOLDER id | DATA id | FOLDER NAME |
|---|---|---|---|
| 1 | — | — | TOP |
| 2 | 1 | — | COMPANY INFORMATION |
| 3 | 1 | 5 | IR INFORMATION |
| 4 | 1 | — | CONTENTS SERVICE |
| 5 | 2 | 1 | GREETING |
| 6 | 2 | 2 | OVERVIEW |
| 7 | 2 | 3 | HISTORY |
| 8 | 2 | 4 | GUIDE MAP |
| 9 | 3 | — | STOCK STATUS |
| 10 | 3 | — | ACCOUNT STATEMENT |
| ... | ... | ... | ... |

FIG. 5

| DATA id | FOLDER id | DATA |
|---------|-----------|------|
| 1 | 5 | GREETING REPRESENTATIVE DIRECTOR |
| 2 | 6 | OVERVIEW AS OF AUGUST 8, 2005 |
| 3 | 7 | HISTORY AS OF AUGUST 8, 2005 |
| 4 | 8 | GUIDE MAP ACCESS |
| 5 | 3 | NEWS PERSONNEL CHANGES |
| ... | ... | ... |

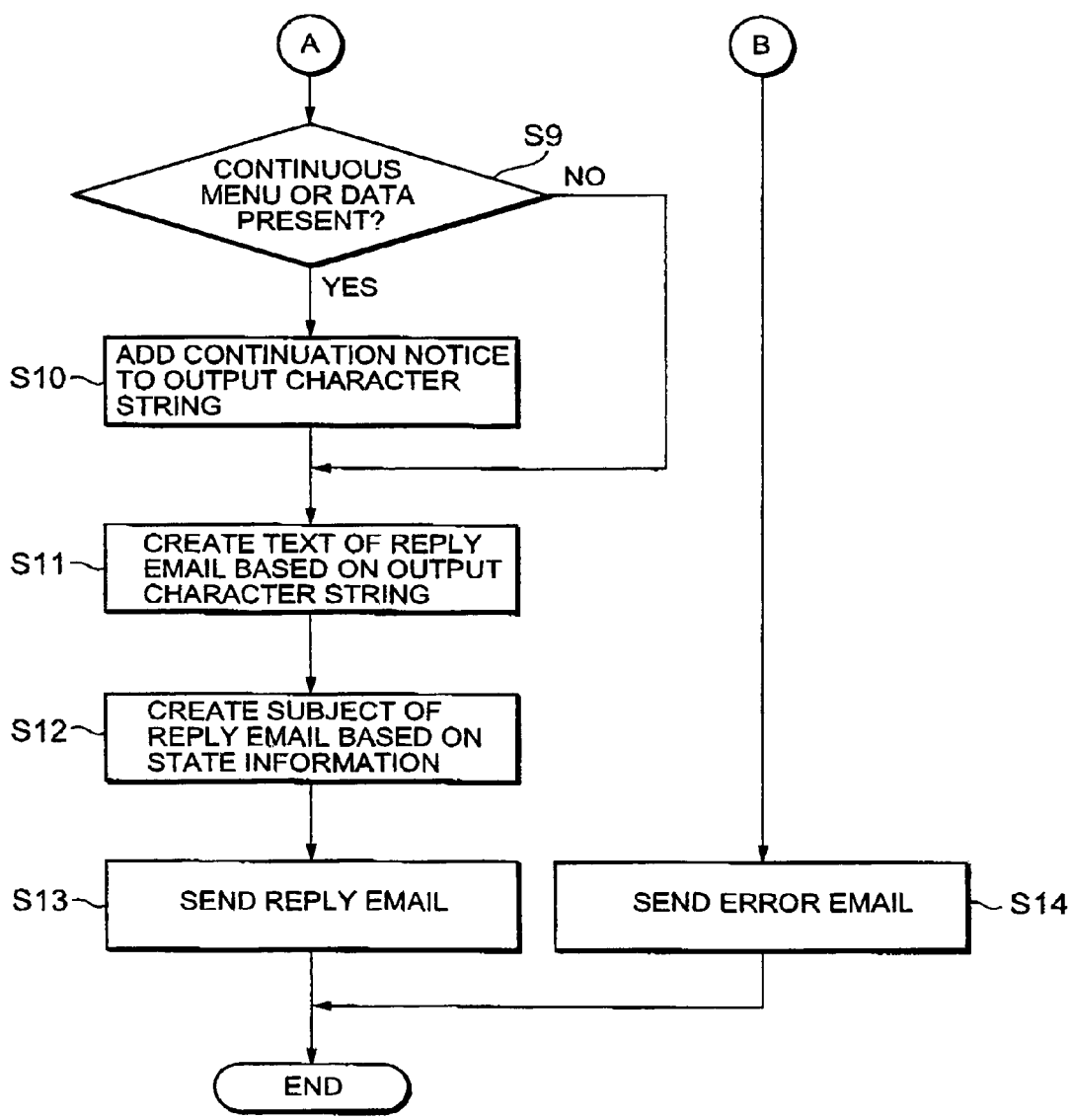

EMAIL INFORMATION PROVIDING SERVER, EMAIL INFORMATION PROVIDING SYSTEM, EMAIL INFORMATION PROVIDING METHOD AND EMAIL INFORMATION PROVIDING PROGRAM

The present disclosure relates to subject matter contained in Japanese Patent Application No. 2005-280640, filed on Sep. 27, 2005, the disclosure of which is expressly incorporated herein by reference in its entirety.

BACKGROUND OF THE INVENTION

1. Field of the Invention

The present invention relates to an email information providing server that uses the email function of a portable terminal to provide various information services, instead of conventional facsimile (hereinafter referred to as FAX) information services provided by FAX, an email information providing system, an email information providing method and an email information providing program.

2. Description of the Related Art

Conventionally, there are FAX information services, provided by FAX, through which various types of information, company information, housing information and traffic information, for example, can be obtained (hereinafter, such information, when provided by FAX, is called FAX information).

To receive the FAX information service, a user accesses a FAX information service providing company by telephone, for example, and receives, by FAX, an indexed listing representing the contents of the FAX information available from the provider (e.g., when the FAX information is housing information, included are the title "housing information" and information as to the location (e.g., a prefecture) to which the housing information is related).

Included in the indexed listing are ID numbers for obtaining corresponding FAX information. Thus, when desired information is provided in an indexed listing that is received, the user again telephones the FAX information service providing company, and by manipulating the telephone push buttons, enters the ID number included in the indexed listing and the telephone number (the FAX number) of the FAX machine that can output the desired FAX information.

Upon receiving the ID number and the FAX number, the FAX information service providing company transmits the FAX information corresponding to the ID number to the FAX machine that is consonant with the received FAX number. And as a result, the desired FAX information is obtained by the user.

Before receiving the FAX information service described above, a user must know what kind of FAX information service providing companies are available and what FAX information services the individual FAX information service providing companies are prepared to provide.

However, since in booklets issued by NTT or in advertisements in other magazines, for example, the spaces allocated for this information are small, what is available by FAX is not well known and FAX information services are infrequently used, even though for these services many kinds of useful FAX information have been prepared.

Further, reception of FAX information is complicated, i.e., as described above, first, the user calls the FAX information service providing company, obtains an indexed listing, telephones again and enters an ID number and a FAX number. Furthermore, since an indexed listing is obtained that initially is not required by the user, an unnecessary communication cost is incurred and paper is wasted.

In order to reduce paper waste, there is a method involving the use of a FAX machine that includes a display unit, such as a liquid crystal screen. That is, using such a FAX machine, when an indexed listing is received it can be viewed using the display unit, rather than being output to paper. However, while taking into account reductions in the sizes and weights of FAX machines and the accompanying costs, display units can not be made large enough to enable the appropriate viewing of indexed listings that have been received. As a result, when an indexed listing is presented on a display unit, individual characters can not easily be distinguished.

Therefore, in Japanese Patent Laid-Open Publication No. 1996-336029, a facsimile system is proposed wherein indexed entries representing the contents of FAX information are superimposed with a television broadcast signal for a broadcast performed by a broadcast station, and when, while employing a monitor, a user selects one of the indexed entries and requests, using a public line, that a FAX information service providing company transmit FAX information corresponding to the selected indexed entry, the thus requested FAX information is transmitted to the FAX machine of the user.

However, according to Japanese Patent Laid-Open Publication No. 1996-336029, as described above, since information obtained by FAX is image information, subsequent actions required to access desired information are rather irksome. For example, a telephone number, output by a FAX machine and printed on paper, must be dialed.

Furthermore, the provision of a FAX information service requires a suitable environment for the installation of a FAX machine. And even when a FAX machine is installed, since the paper Output must be managed, the operation is still very troublesome.

In addition, since the locations whereat FAX information services can be received are limited to those whereat FAX machines are installed, FAX information can not be acquired at arbitrary times, as required.

As a solution for resolving these problems, a technique has been proposed that is described in Japanese Patent Laid-Open Publication No. 2003-76711. According to this technique, an arbitrary document form, in which desired information is listed, is created by a user using unspecified word processor, or text editor, software installed in a user terminal, and is transmitted, as email, to a search site at a designated email address to execute a search. Upon receiving the email, the search site uses a translating device to automatically extract a necessary keyword, and uses a search device to perform a search, based on the extracted keyword, and transmits the search results to the user terminal.

However, even though with this technique desired information can be obtained more easily than when the FAX information service proposed in Japanese Patent Laid-Open Publication No. 1996-336029 is resorted to, since the technique disclosed in this publication is based on the assumption that common PCs (personal computers) will be used, locations where desired information is available are limited to those whereat PCs are installed. Thus, a continuing problem is that necessary information can not easily be acquired at an arbitrary time.

Further, when the technique described in the above publication, according to which a free document form is prepared by a user to obtain desired information, is to be employed for a portable terminal, an extremely complicated input operation is required because for a portable terminal, when compared with a common PC (personal computer), the number and sizes of keys are limited to provide a reduced size and weight.

SUMMARY OF THE INVENTION

While taking this situation into account, the objectives of the present invention are to provide an email information providing server with which necessary information can be easily acquired, at arbitrary times, an email information providing system, an email information providing method and an email information providing program.

According to the present invention, an email information providing server, for providing various types of information services using the email function of a portable terminal, comprises:

an information storage unit, for correlating, with IDs, folders and hierarchically managing the folders in accordance with the IDs that are correlated;

a first email generator, for, upon receiving an access email from the portable terminal, examining the folder names correlated with the IDs stored in the information storage unit and generating a reply email that includes a folder name included in a first rank and a folder name included in a second rank immediately below the folder name;

a first reply unit, for transmitting the reply email generated by the first email generator to the portable terminal at an accessing source;

a determination unit, for, upon receiving an access email from the portable terminal, determining whether the access email includes the folder name in the second rank that is included in the reply email transmitted by the first reply unit;

a second email generator, for, when the determination unit determines that the access email includes the folder name, examining the folder names correlated with the IDs stored in the information storage unit and generating a reply email that includes a folder name in the second rank and a folder name in a third rank immediately below the folder name; and a second reply unit for transmitting the reply email generated by the second email generator to the portable terminal at the access source.

In the access email transmitted by the portable terminal, a folder name in a higher rank may be displayed as a title, and a rank lower than the higher rank may be displayed in the text.

According to the present invention, an email information providing system, for providing various types of information services using the email function of a portable terminal, comprises:

a portable terminal; and
an email information providing server including
an information storage unit, for correlating, with IDs, folder names that indicate directories and hierarchically managing the folder names in accordance with the IDs that are correlated, a first email generator, for, upon receiving an access email from the portable terminal, examining the folder names correlated with the IDs stored in the information storage unit and generating a reply email that includes a folder name included in a first rank and a folder name included in a second rank immediately below the folder name, a first reply unit, for transmitting the reply email generated by the first email generator to the portable terminal at an accessing source, a determination unit, for, upon receiving an access email from the portable terminal, determining whether the access email includes the folder name in the second rank that is included in the reply email transmitted by the first reply unit, a second email generator, for, when the determination unit determines that the access email includes the folder name, examining the folder names correlated with the IDs stored in the information storage unit and generating a reply email that includes a folder name in the second rank and a folder name in a third rank immediately below the folder name, and a second reply unit for transmitting the reply email generated by the second email generator to the portable terminal at the access source.

In the access email transmitted by the portable terminal, a folder name in a higher rank may be displayed as a title, and a rank lower than the higher rank may be displayed in the text.

According to the present invention, an email information providing method, for providing various types of information services using the email function of a portable terminal, comprises the steps of:

correlating, with IDs, folders and hierarchically managing the folders in accordance with the IDs that are correlated;

upon receiving an access email from the portable terminal, examining the folder names correlated with the IDs and generating a reply email that includes a folder name included in a first rank and a folder name included in a second rank immediately below the folder name;

transmitting the reply email to the portable terminal at an accessing source;

upon receiving an access email from the portable terminal, determining whether the access email includes the folder name in the second rank that is included in the reply email;

when it is determined that the access email includes the folder name, examining the folder names correlated with the IDs and generating a reply email that includes a folder name in the second rank and a folder name in a third rank immediately below the folder name; and transmitting the reply email to the portable terminal at the access source.

In the access email transmitted by the portable terminal, a folder name in a higher rank may be displayed as a title, and a rank lower than the higher rank may be displayed in the text.

According to the present invention, an email information providing program, for executing an email information providing method for providing various types of information services using the email function of a portable terminal, comprises:

correlating, with IDs, folders and hierarchically managing the folders in accordance with the IDs that are correlated;

upon receiving an access email from the portable terminal, examining the folder names correlated with the IDs and generating a reply email that includes a folder name included in a first rank and a folder name included in a second rank immediately below the folder name;

transmitting the reply email to the portable terminal at an accessing source;

upon receiving an access email from the portable terminal, determining whether the access email includes the folder name in the second rank that is included in the reply email;

when it is determined that the access email includes the folder name, examining the folder names correlated with the IDs and generating a reply email that includes a folder name in the second rank and a folder name in a third rank immediately below the folder name; and transmitting the reply email to the portable terminal at the access source.

In the access email transmitted by the portable terminal, a folder name in a higher rank may be displayed as a title, and a rank lower than the higher rank may be displayed in the text.

According to the email information providing server, the email information providing system, the email information providing method and the email information providing program, folders are correlated with IDs, and are hierarchically managed in accordance with the correlated IDs; upon receiving an access email from the portable terminal, the folder names correlated with the IDs are examined, and a reply email that includes a folder name included in a first rank and a folder name included in a second rank immediately below the folder name is generated; the reply email is transmitted to the portable terminal at an accessing source; upon receiving an access email from the portable terminal, it is determined whether the email includes the folder name in the second rank that is included in the reply email; when it is determined that the email includes the folder name, the folder names correlated with the IDs are examined, and a reply email that includes a folder name in the second rank and a folder name in a third rank immediately below the folder name is generated; and the reply email is transmitted to the portable terminal at the access source. With this arrangement, necessary information can be easily obtained at an arbitrary time.

BRIEF DESCRIPTION OF THE DRAWINGS

FIG. 4 is a diagram for explaining a data configuration for the data hierarchical structure in FIG. 3;

FIG. 5 is a diagram for explaining data at the lowest rank in FIG. 4;

FIG. 8 is a flowchart for explaining the email information providing method employed by the email information providing server in FIG. 1;

DESCRIPTION OF THE EMBODIMENTS

Figure 1:
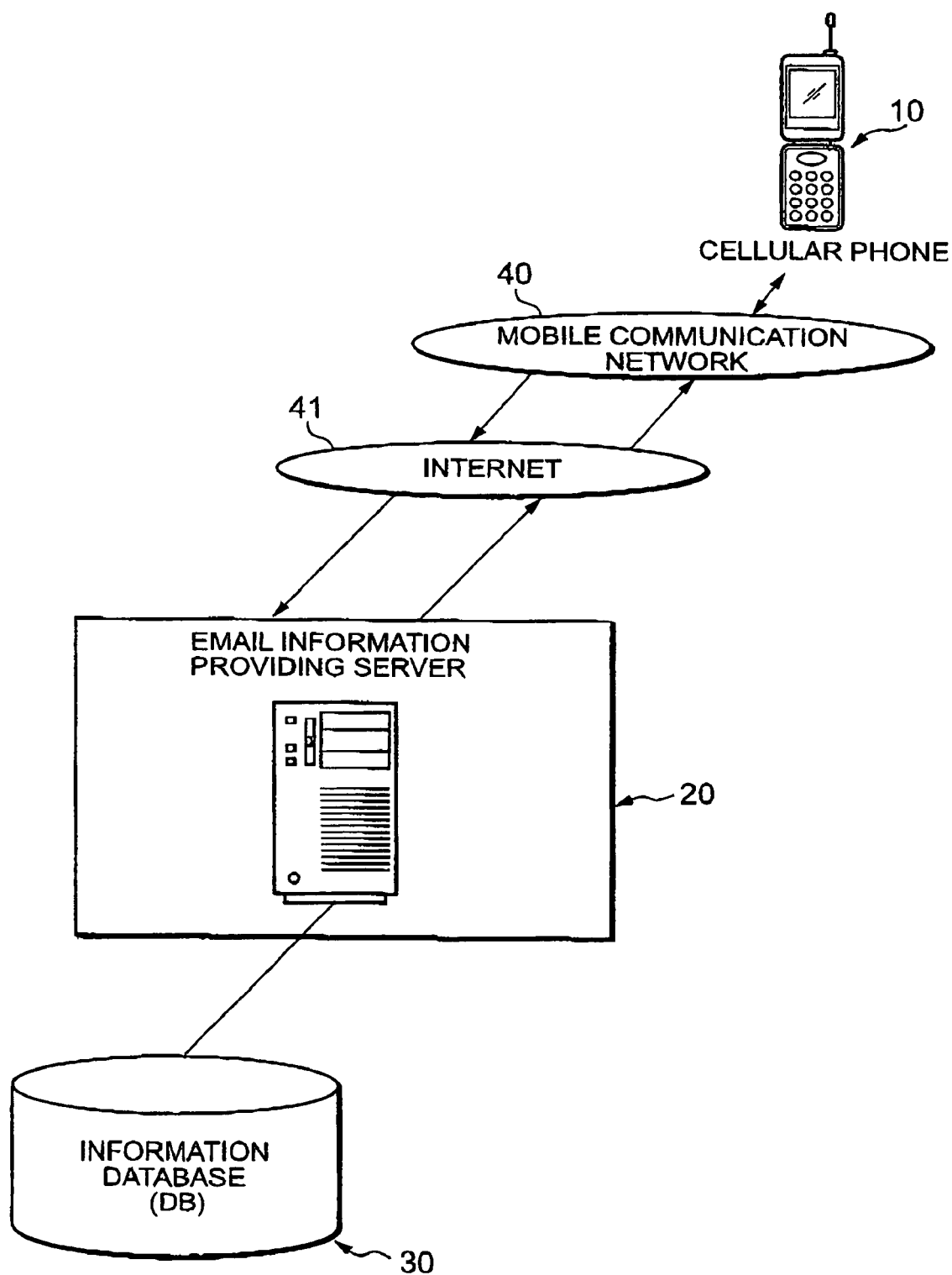
FIG. 1 is a diagram for explaining an overview of an email information providing system according to one embodiment of the present invention.

The details of the present invention will now be described while referring to the drawings.

FIG. 1 is a diagram for explaining an overview of an email information providing system according to the embodiment of the present invention.

The email information providing system in FIG. 1 includes a cellular phone 10, an email information providing server 20 and an information database (DB) 30. The cellular phone 10 is a terminal device that can exchange email through communication with the email information providing server 20 via a mobile communication network 40 for communication carriers and via the Internet 41, which is a communication line. In this embodiment, the cellular phone 10 is employed as an example; however, the terminal device that can be used is not limited to the cellular phone 10, and may, for example, be a PDA that can exchange email.

In accordance with the contents of an email received from the cellular phone 10, the email information providing server 20 determines what information is desired by a user, and provides the pertinent information to the user.

Figure 2:
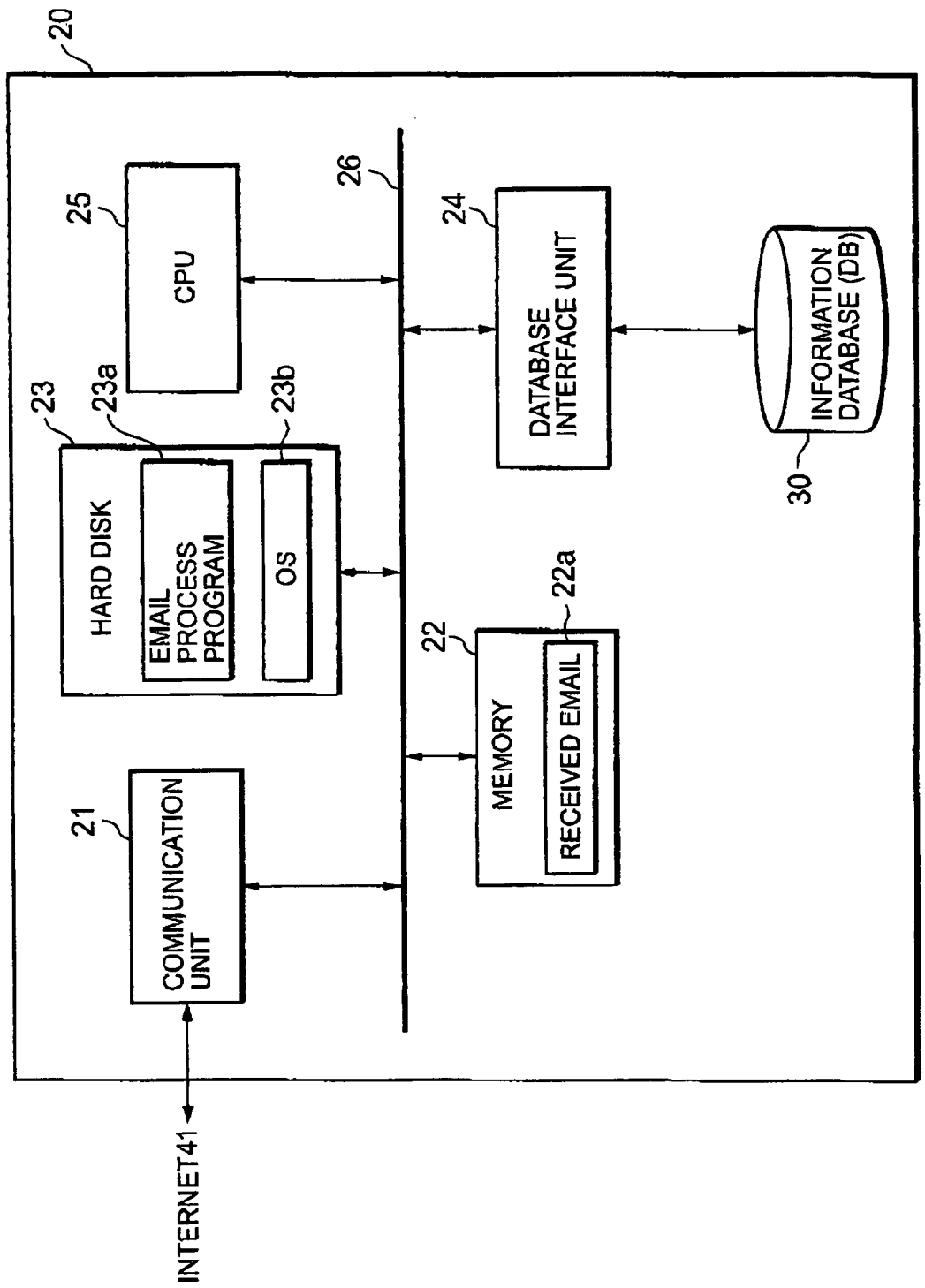
FIG. 2 is a detailed diagram for explaining an email information providing server in FIG. 1.

FIG. 2 is a detailed diagram for explaining the email information providing server 20. The email information providing server 20 includes a communication unit 21, a memory 22, a hard disk 23, a database interface unit 24 and a CPU 25.

The communication unit 21 performs packet communication with the cellular phone 10 via the Internet 41, and obtains data contained in email 22a that is received. The memory 22, which is an email storage unit, is used to store email 22a received from the cellar phone 10. The email 22a that is received may be stored temporarily, or the data contained therein may be shifted from the memory 22 to the hard disk 23 and stored for a specific period of time.

An email processing program 23a and an OS (Operating System) 23b are stored on the hard disk 23.

The database interface unit 24 is connected to the information DB 30 to exchange data. The CPU 25 controls the operations of the communication unit 21, the memory 22, the hard disk 23 and the database interface unit 24. It should be noted that the communication unit 21, the memory 22, the hard disk 23, the database interface unit 24 and the CPU 25 are connected by a bus 26.

The CPU 25, to perform the first email generation function, reads the email process program 23a, a first reply function, a determination function, a second email generation function and a second reply function. The first email generation function is a function whereby, when an access email is received from the cellular phone 10, a correlation between folders and IDs stored in the information DB 30, which will be described later, is referred to, and a reply email is generated that includes a folder name belonging to a first rank, and immediately below this folder name, a folder name belonging to a second rank.

The first reply function is used for transmitting a reply email generated by the first reply email generation function to the cellular phone 10 that is the access source. The determination function is used to determine, when an access email is received from the cellular phone 10, whether the email includes a folder name that belongs to the second rank that is included in the reply email transmitted by the first reply function.

The second email generation function is used, when the determination function determines that the email includes the folder name, to refer to the correlation between folders and IDs stored in the information database (DB) 30, which will be described later, and to generate a reply email that includes a folder name belonging to the second rank, and immediately below this folder name, a folder name that belongs to a third rank. The second reply function is used to transmit a reply email, generated by the second email generation function, to the cellular phone 10 that is the access source.

The information DB 30 is used to store, using a hierarchical structure, data to be provided for the cellular phone 10.

Figure 3:
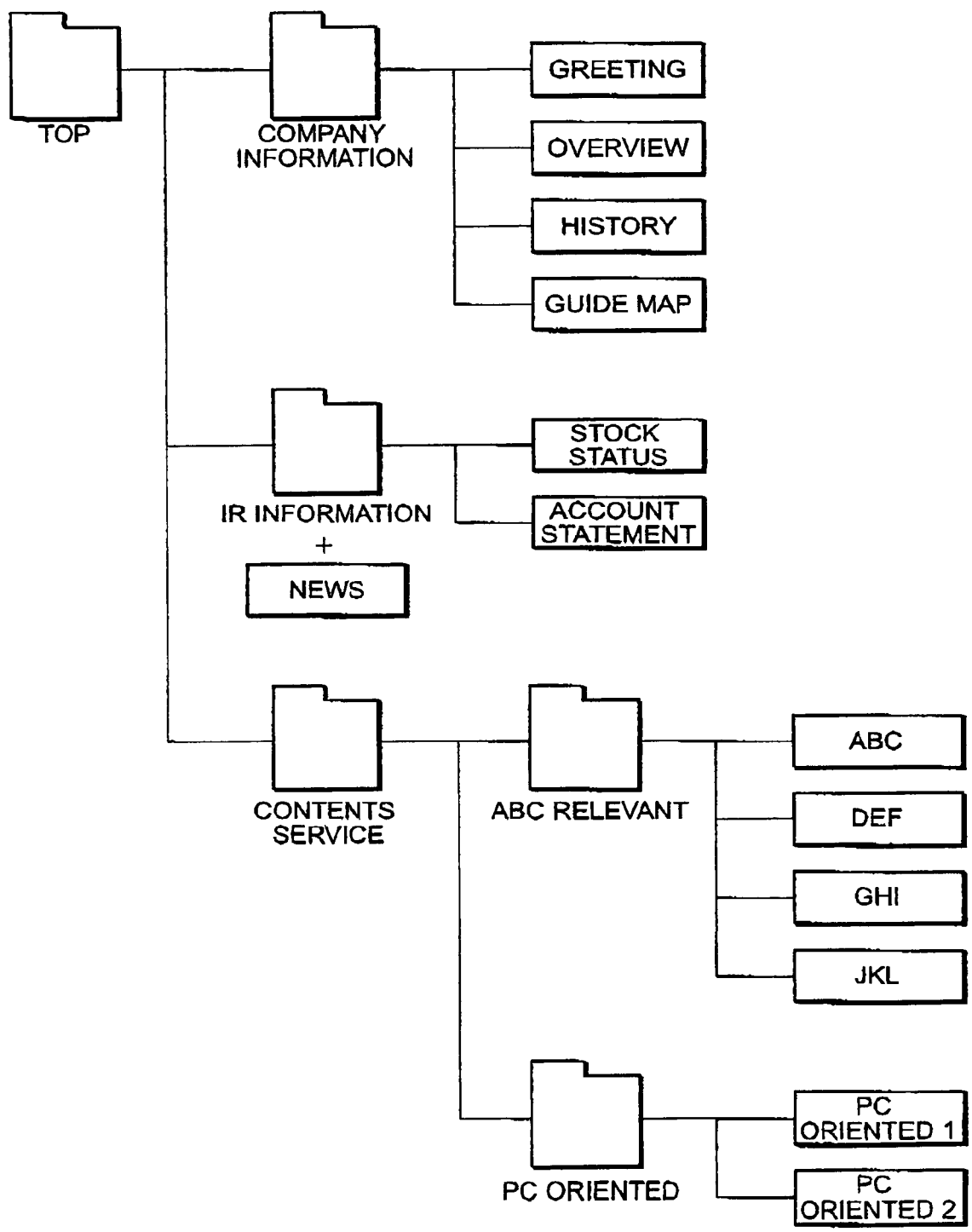
FIG. 3 is a diagram for explaining the hierarchical structure of data stored in an information database (DB) in FIG. 1.

The hierarchical structure of the data stored in the information DB 30 will now be explained. As shown in FIG. 3, for example, folders "company information", "IR information" and "contents service" are located in the rank immediately below the folder "top" in the highest rank, and when information is to be obtained from "top", "company information", "IR information" and "contents service" are displayed as menu items.

Further, data "greeting", "overview", "history" and "guide map" are located in the rank immediately below "company information". Thus, when data are to be obtained from "company information", "greeting", "overview", "history" and "guide map" are displayed as menu items, and when "greeting" is selected from the menu, data for "greeting" are displayed.

Data "news" is located in the same rank as "IR information", and data "stock status" and "account statement" are located in the rank immediately below "IR information". Then, when information is to be obtained from "IR information", data "news" and data "stock status" and "account statement" are displayed as menu items.

In addition, "ABC relevant" and "PC oriented" folders are located in the rank immediately below "contents service", and data "ABC", "DEF", "GHI" and "JKL" are located in the rank immediately below the "ABC relevant" folder, while data "PC oriented 1" and "PC oriented 2" are located in the rank immediately below the "PC oriented" folder.

The data structure used for the hierarchical arrangement of these data will now be described. Specifically, as shown in FIG. 4, the data structure includes: folder ids, for identifying folders; upper folder ids, which indicate the ranks of the individual folders; data ids, which indicate the data present in the individual folders; and folder names, which represent the names of the individual folders.

As shown in FIG. 5, data in the lowest rank are correlated with the data ids and the folder ids. The designation function compares a keyword with these folder names to determine a location (a folder) from which information is to be obtained.

Figure 6:
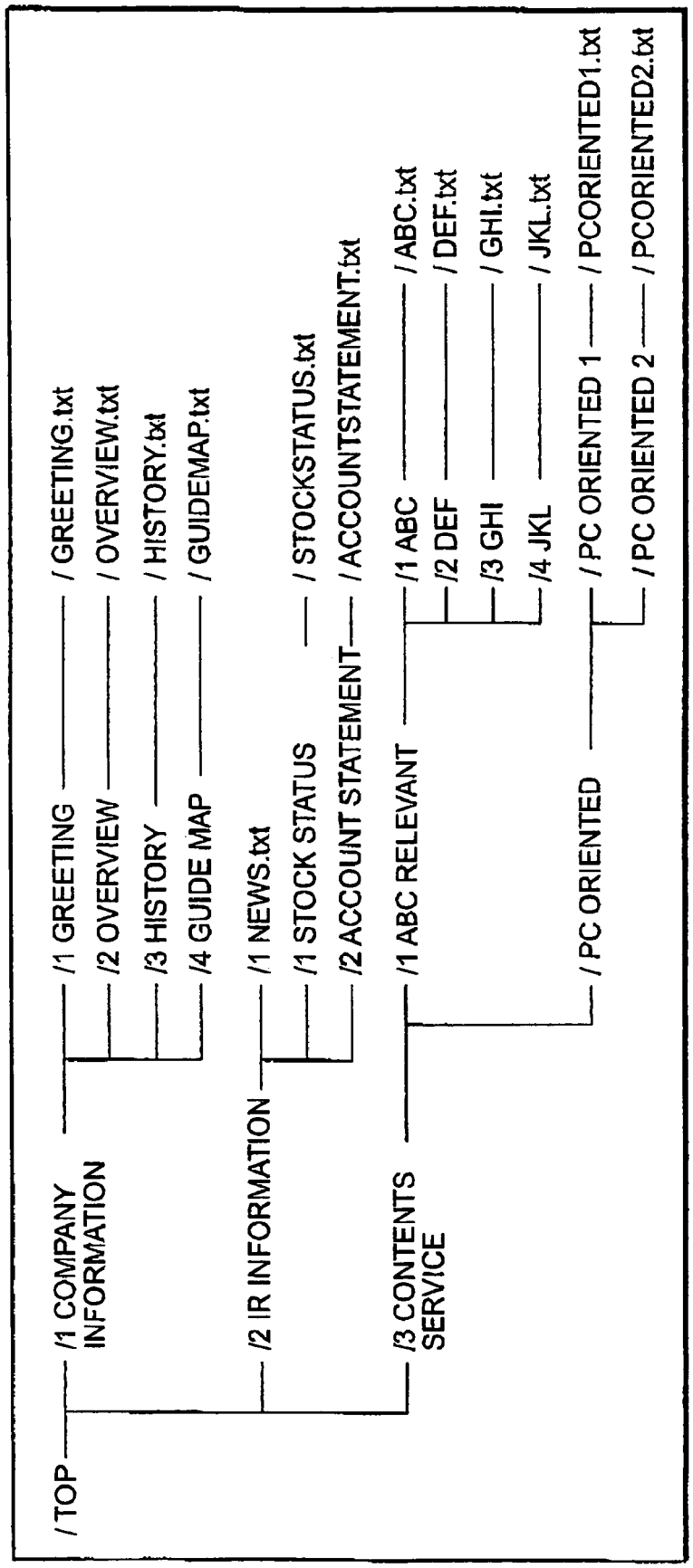
FIG. 6 is a diagram for explaining, as files, the hierarchical structure of data stored in the information database (DB) in FIG. 1.

Instead of data having the data structure as explained in FIGS. 4 and 5, information for a file form shown in FIG. 6 may be stored in the information DB 30. In this case, the information for the file form is designated by selecting a file path correlated with a keyword.

While referring to the file form in FIG. 6, information is stored in accordance with the same hierarchical arrangement as the data structure in FIG. 4. That is, as information for the file form, keywords "company information", "IR information" and "contents service" are located in the rank immediately below the highest rank "top". When information is to be obtained from "top", "company information", "IR information" and "contents service" are displayed as menu items.

Furthermore, keywords "greeting", "overview", "history" and "guide map" are located in the rank immediately below "company information", and when is information is to be obtained from "company information", the keywords "greeting", "overview", "history" and "guide map" are displayed as menu items. Then, when "greeting" is selected from the menu, text data "greeting" is displayed.

Text data. "news" and keywords "stock status" and "account statement" are located in the rank immediately below "IR information", and when information is to be obtained from "IR information", text data "greeting" and keywords "stock status" and "account statement" are displayed as menu items. Then, when "stock status" is selected from the menu, text data "stock status" is displayed.

Moreover, keywords "ABC relevant" and "PC oriented" are located in the rank immediately below "contents service", keywords "ABC", "DEF", "GHI" and "JKL" are located in the rank immediately below "ABC relevant", and text data are located in the rank immediately below the corresponding keywords. Further, keywords "PC oriented 1" and "PC oriented 2" are located in the rank immediately below "PC oriented", and text data are located in the rank immediately below the corresponding keywords.

Since the information for file forms is not specifically managed by using ids, the designation function compares the keywords with the folder names and determines a location (a folder) from which information is to be obtained. In this manner, a data search can easily be performed.

Figure 7:
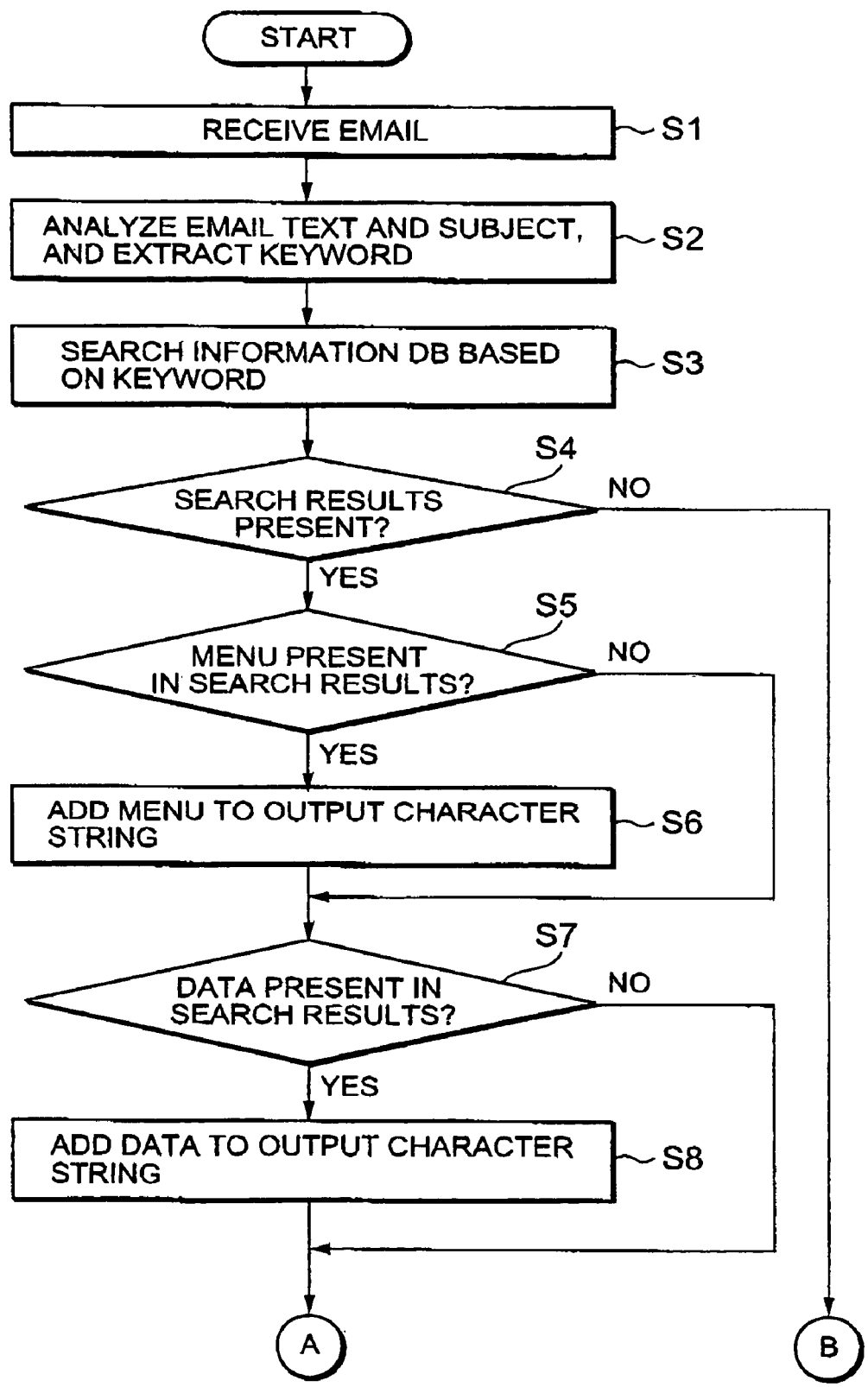
FIG. 7 is a flowchart for explaining an email information providing method employed by the email information providing server in FIG. 1.

An email information providing method performed by the email information providing server 20 will now be explained. First, as shown in FIG. 7, a user employs the cellular phone 10 to send an email to the email information providing server 20 through the mobile communication network 40 and the Internet 41. The communication unit 21 of the email information providing server 20 receives the email from the user, and temporarily stores it in the memory 22 as a received email 22a (step S1). It should be noted that the received email 22a is stored merely temporarily and only for the extraction of a keyword.

Then, the keyword extraction function analyzes the Subject (title), which is the name of the email, and the text contents of the email, and extracts a keyword (step S2).

Figure 9A:
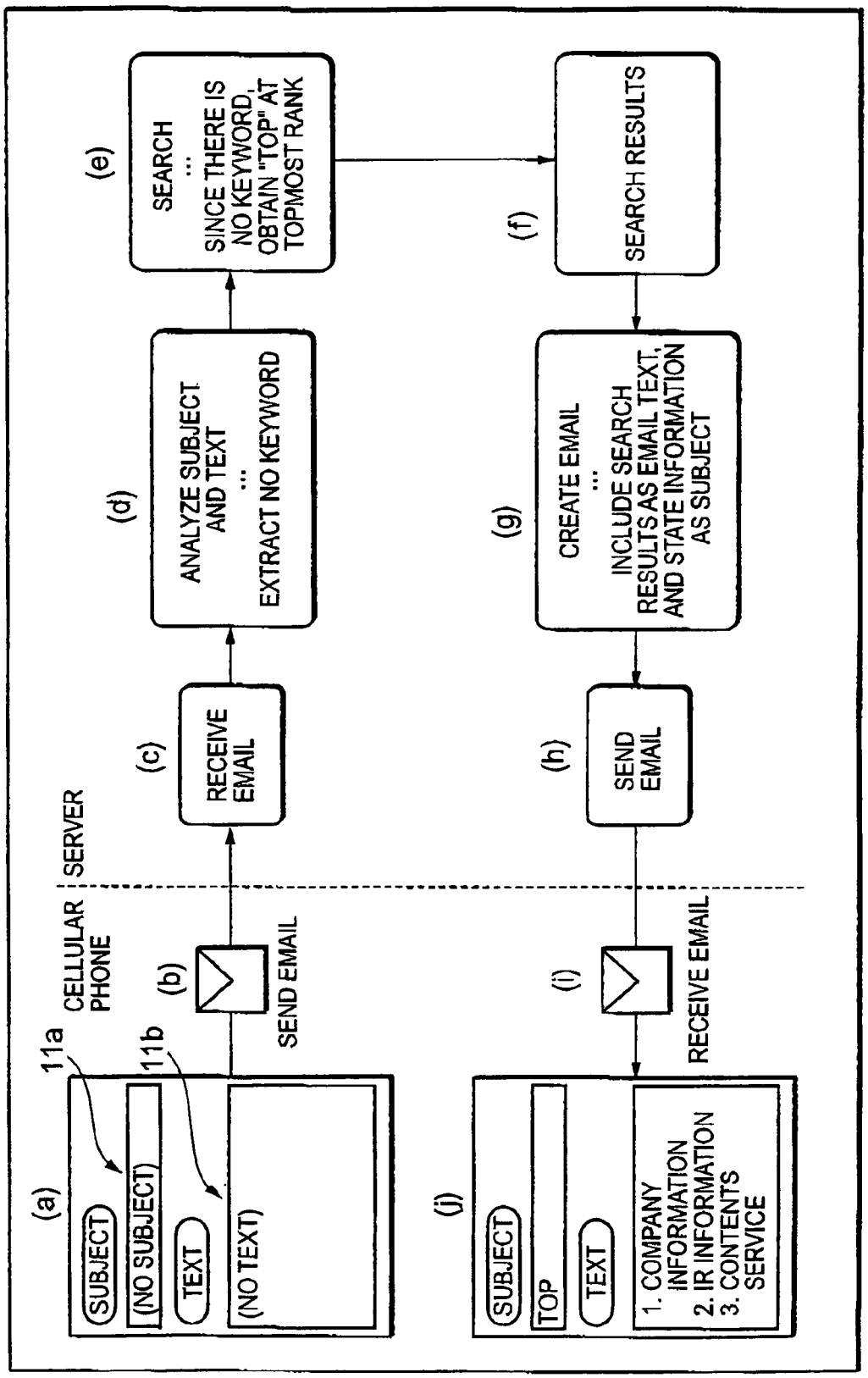
FIG. 9 is a diagram for explaining the email information providing method employed by the email information providing server in FIG. 1.

In this embodiment, assume that, as shown in FIG. 9A, a user who employs the cellular phone 11 has sent, as in a manner (b), an email (a) wherein the Subject (title) 11a and text 11b are blank, and that the email is received via the communication unit 21 in a manner (c).

At this time, as in (d), the keyword extraction function analyzes the Subject (title) 11a and the contents of the text 11b and extracts a keyword. Since the Subject (title) 11a and the text 11b are blank in the first email, no keyword is extracted.

In this case, as in (e), the acquisition function obtains a menu list from the information DB 30 (step S3). That is, when no keyword is extracted, the topmost "top" in the highest rank is obtained from the information database (DB) 30.

When the topmost "top" is obtained from the menu list and the acquisition function obtains the search results, as in (f) in FIG. 9A, the reply email generation function creates an email, as in (g). The reply email generation function enters the search results as the email form in the text 11b.

State information is entered as the Subject (title) 11a. The state information is information indicating the current state, such as a location (folder) from which information is currently being extracted.

Thereafter, as in (h) in FIG. 9A, the email replying function transmits to the cellular phone 10 that is the transmission source, the email wherein the search results and the state information have been entered, This email is received by the cellular phone 10, as in (i).

At this time, as shown in (j), "top" is displayed in the Subject (title) 11a on the screen of the cellular phone 10, while "company information", "IR information" and "contents service", which are in the rank immediately below "top", are displayed with the numerals "1." to "3." in the text 11b.

Figure 9B:
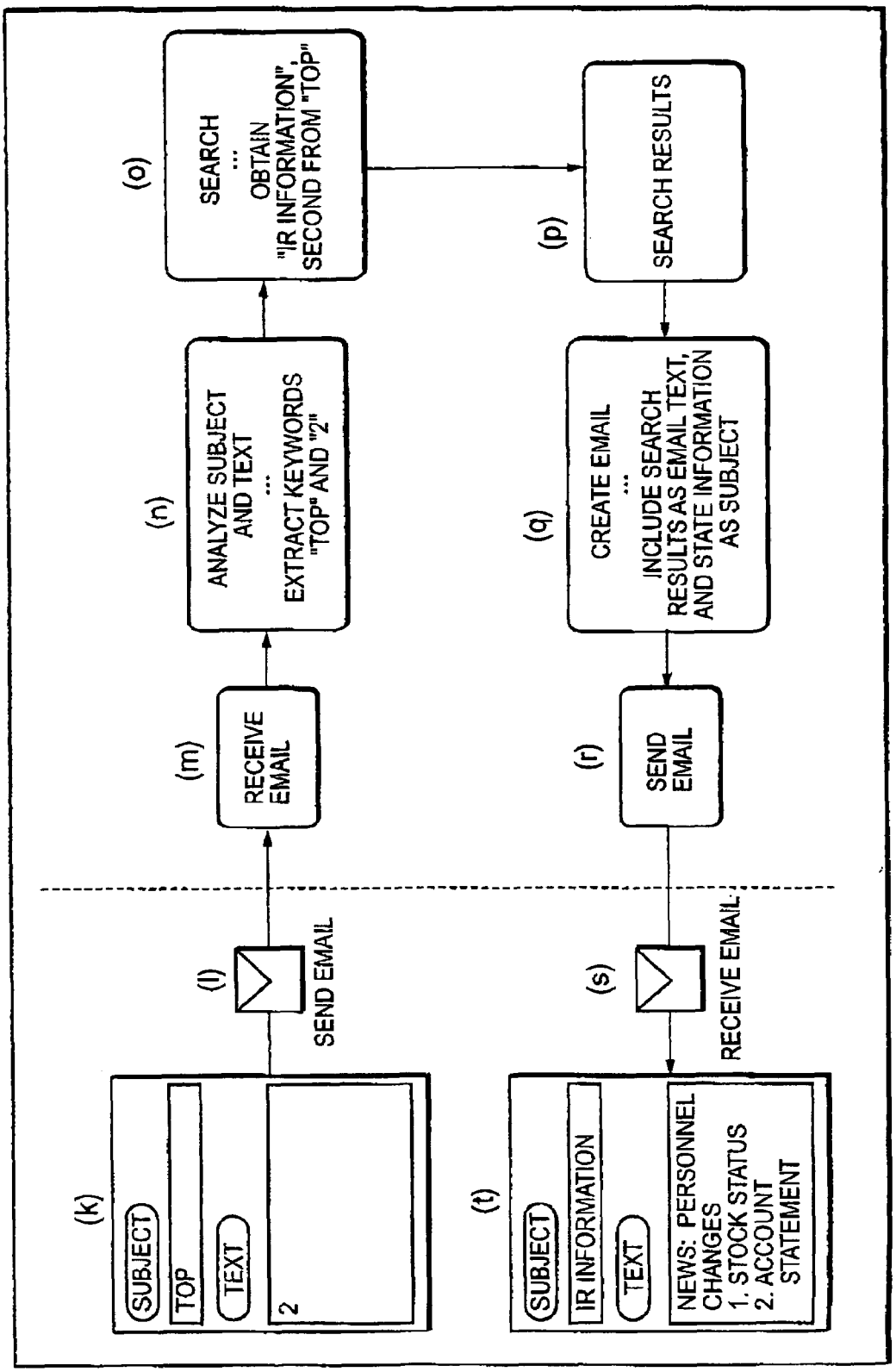

Then, when the user has entered "2", for example, in the text 11b, as in (k) in FIG. 9B, and has sent an email, as in (l), and when the communication unit 21 of the email information providing server 20 has received the email, as in (m), this email is temporarily stored in the memory 22, in the above described manner, as a received email 22a.

Sequentially, as in (n) in FIG. 9B, the keyword extraction function analyzes the contents of the text 11b and the Subject (title) 11a of the email, and extracts keywords. In this case, "top" and "2" are extracted as keywords.

When these keywords have been extracted, first, as in (o) in FIG. 9B, the acquisition function searches for the folder name "top", and obtains the second rank from the menu displayed for the folder. That is, for the data structure described above, since the folder id of "top" is "1", "IR information", which is the second item for which the upper folder id is "1", is searched for. Further, the same search is performed for the above described file form.

Thereafter, whether search results are present is determined (step S4). When search results are not present, as shown in FIG. 8, an error email requesting a retransmission is sent to the cellular phone 10 of the user (step S14).

When the search results are present, as in (p) in FIG. 9B, the acquisition function determines whether a menu is included in the search results (step S5). When there is a menu, the menu is added to an output character string (step S6). When there is no menu, the addition of a menu to an output character string is not performed.

Next, whether data are present in the search results is determined (step S7). When there are data present in the search results, the data are added to an output character string (step S8). When there are no data present, the addition of data to an output character string is not performed.

Furthermore, as shown in FIG. 8, the acquisition function determines whether there is a continuation of a menu or data (step S9). When there is a continuation, a continuation notice is added to an output character string (step S10). When there is no continuation, the addition of a continuation notice to an output character string is not performed.

Sequentially, as in (q) in FIG. 9B, the reply email generation function creates an email. In this case, the reply email creation function employs an output character string to create text for the reply email (step S11). Specifically, the search results are entered as an email form in the text 11b. In addition, the reply email generation function creates the Subject (title) 11a for the reply email based on the current state information of the subject (title) 11a (step S12), and as in (r) in FIG. 9B, the email replying function transmits the reply email to the cellar phone 10 that is the transmission source (step S13). Then, as in (s) in FIG. 9B, the reply email is received by the cellular phone 10.

When the reply email is received by the cellular phone 10, as in (t) in FIG. 9B, "IR information" is displayed in the Subject (title) 11a on the screen of the cellular phone 10, and "news . . . ", "stock status" and "account statement" are displayed in the text 11b.

Hereinafter, in the same manner, the user need only confirm the contents of the email received from the email information providing server 20 and enter a number displayed in the text 11b to obtain various types of email information.

When the reply email generation function enters the search results as an email form in the text 11b, the email address, the URL and the phone number may also be included to enable the acquisition of a variety of information. Then, the user need only click on the email address, the URL or the phone number displayed on the cellular phone 10, a simple operation, for various actions corresponding to the received information to be immediately performed.

An explanation will be given for the shifting of screens for the cellular phone 10 performed by the email information providing method employed by the email information providing server 20.

Figure 10:
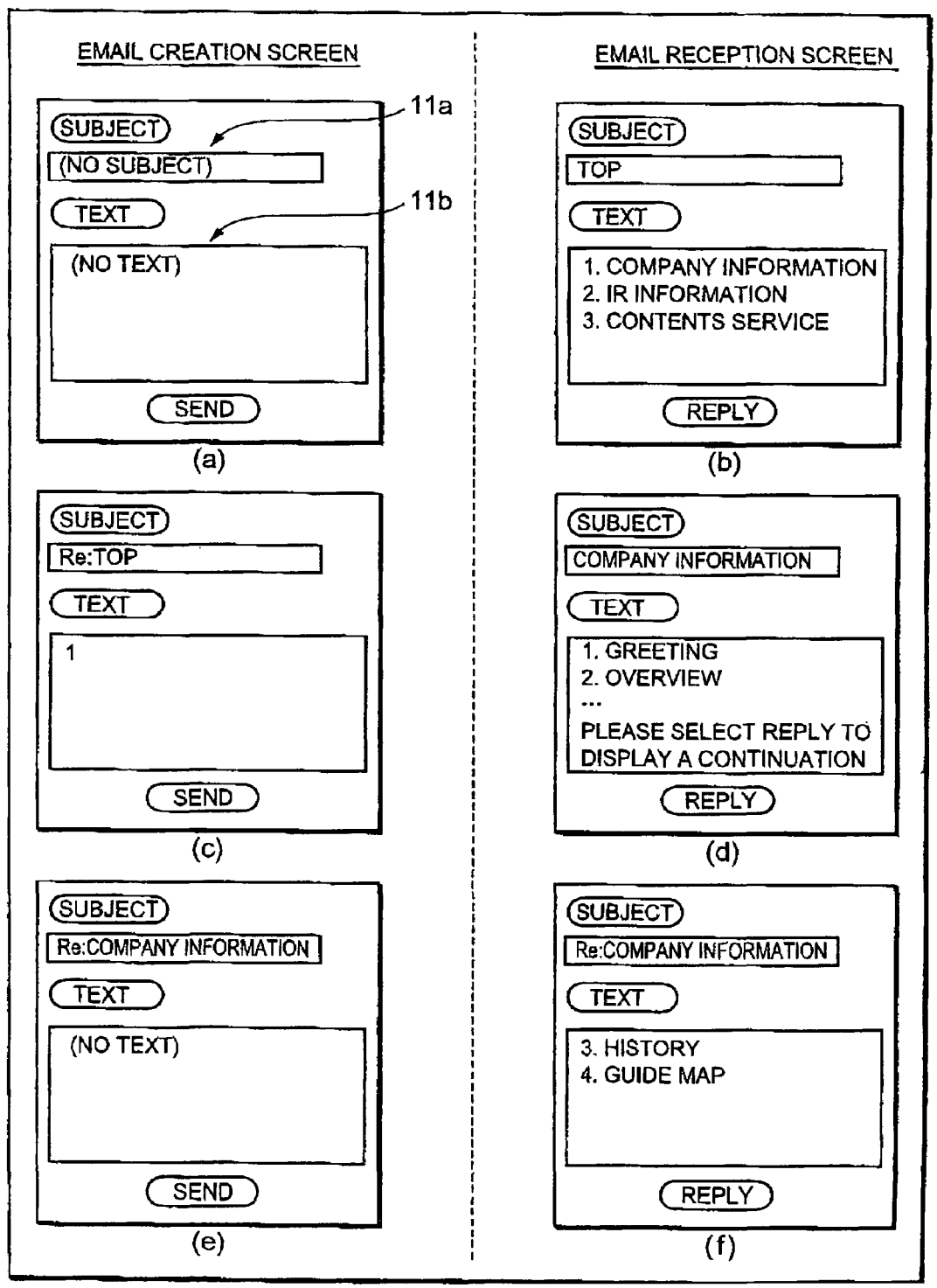
FIG. 10 is a diagram for explaining how the screens of a cellular phone are shifted by the email information providing method employed by the email information providing server in FIG. 1.

First, as shown in FIG. 10, the Subject (title) 11a and the text 11b are blank on the email creation screen, and an email is transmitted to the email information providing server 20(a).

Then, as described above, the keyword extraction function analyzes the Subject (title) 11a and the contents of the text 10b in the email, and extracts a keyword. However, since the Subject (title) 11a and the text 11b of this email are blank, no keyword is extracted.

Furthermore, in this case, the acquisition function obtains a menu list from the information DB 30, and because no keyword was extracted, also obtains the search results by examining the information DB 30. Thereafter, the reply email generation function creates an email. In this case, since the email replying function transmits data in the highest rank on the menu list in the information DB 30, "top" is displayed in the Subject (title) 11a on the screen of the cellular phone 10, and data in the rank immediately below "top" are displayed in the text 11b(b).

That is, "top" is displayed in the Subject (title) 11a, and "company information", "IR information" and "contents service", which are in the rank immediately below "top", are displayed in the text 11b with the numbers "1." to "3.".

When "company information" is to be obtained, "1" is entered in the text 11b, and an email is transmitted to the email information providing server 20(c). In this case, the Subject (title) 11a is (Re: top) as state information. It should be noted that the "Re", which is at the head of the state information, represents a reply symbol; however, "Re" is merely an example, and another character or symbol may be employed.

The keyword extraction function analyzes the contents of the text 11b and the Subject (title) 11a of this email, and extracts keywords. In this case, "top" and "1" are extracted as the keywords.

During the analysis performed by the keyword extraction function, whether the keywords are correct is determined by examining a keyword extraction table (not shown) to ascertain whether the keywords are present therein. When it is determined that the keywords are not correct, an error message requesting the retransmission of an email is transmitted to the cellular phone 10 of the user.

When the extracted keywords are correct, the designation function employs the extracted keywords as a query to designate a location, in the hierarchical structure of the information DB 30, whereat information is to be obtained. Thereafter, the acquisition function obtains information from the designated location.

The reply email generation function creates an email, and the email replying function transmits the search results obtained from the information DB 30. As a result, the search results are displayed on the screen of the cellular phone 10(d).

That is, (company information) is displayed as state information in the Subject (title) 11a, while "1. greeting" and "2. overview" are sequentially displayed in the text 11b.

In this case, there is a continuation of the menu list, and when a continuation is to be displayed, in accordance with an instruction, "Please select reply to display a continuation", a reply email is sent for which the text 11b is blank (e). Then, the keyword extraction function analyzes the contents of the text 11b and the Subject (title) 11a of the email, and extracts a keyword. In this case, only "company information" in the Subject (title) 11a is extracted as a keyword.

Following this, the acquisition function obtains the continuation of the menu list from the information DB 30, and the reply email generation function creates an email. Then, the email replying function transmits the continuation of the menu list obtained from the information DB 30, and the continuation of the menu list is displayed on the screen of the cellular phone 10(f).

As a result, (Re2: company information) is displayed as state information in the Subject (title) 11a, and "3. history"

and "4. guide map" are sequentially displayed in the text 11b. It should be noted that the number "2" following "Re", the head of the state information, represents the second reply relative to "company information".

Figure 11:
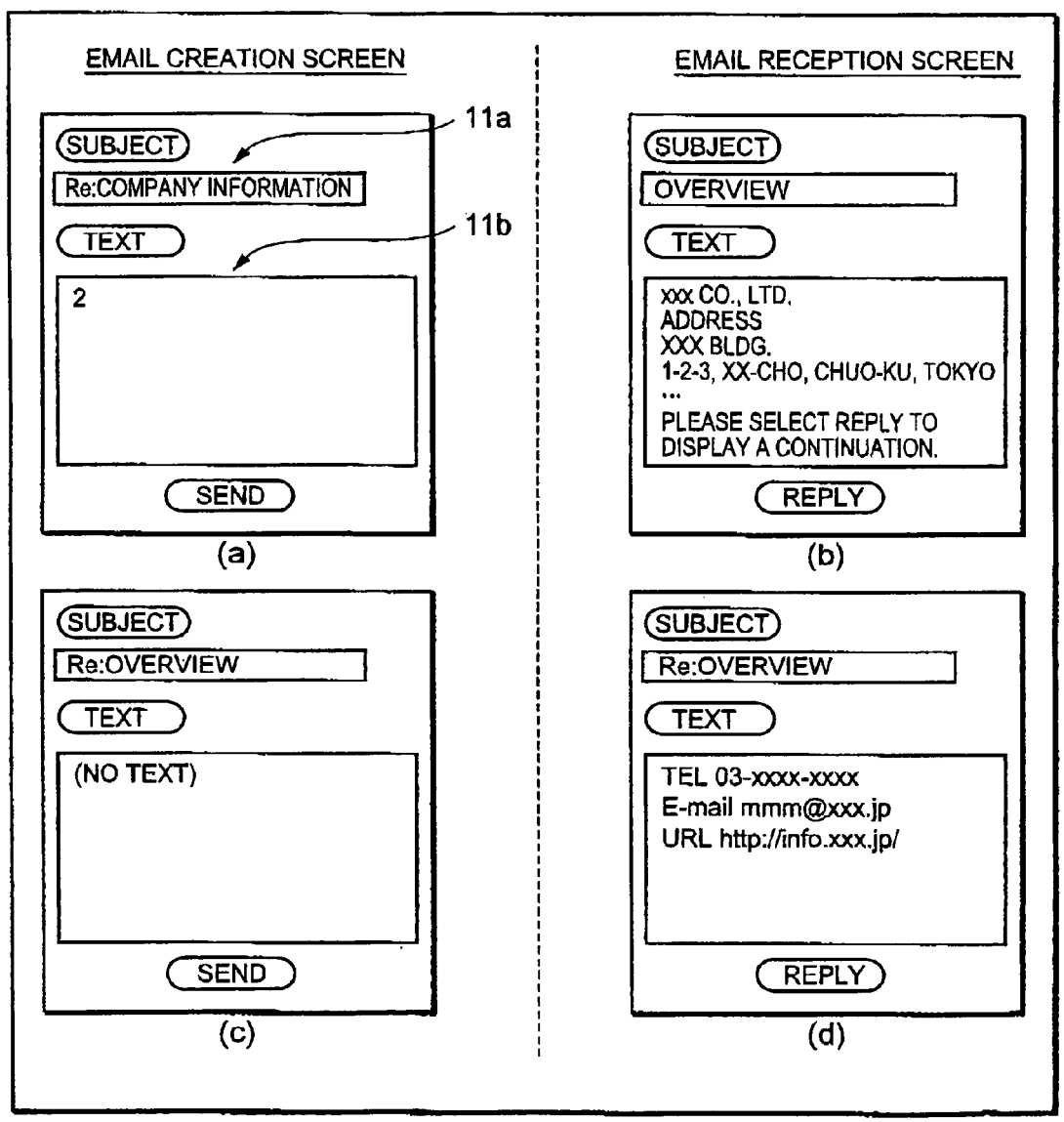
FIG. 11 is a diagram for explaining how the screens of the cellular phone are shifted by the email information providing method employed by the email information providing server in FIG. 1.

When "overview" is to be obtained on the search results at (d), as shown in FIG. 11, "2" is entered in the text 11b and an email is transmitted to the email information providing server 20(a). Then, the keyword extraction function analyzes the contents of the text 11b and the Subject (title) 11a of the email, and extracts keywords. In this case, "company information" in the Subject (title) 11a and "2" in the text 11b are extracted as keywords.

Further, during an analysis performed by the keyword extraction function, whether the keywords are correct is determined by examining a keyword extraction table (not shown) to ascertain whether the keywords are present therein. When it is determined that the keywords are not correct, an error email requesting a retransmission is sent to the cellular phone 10 of the user.

When the extracted keywords are correct, the designation function employs, as a query, the keywords extracted by the keyword extraction function to designate a location in the hierarchical structure of the information DB 30 whereat information is to be obtained. The acquisition function obtains information from the designated location.

Thereafter, the reply email generation function creates an email, and the email replying function transmits the search results obtained from the information DB 30. As a result, the details for "overview" are displayed on the screen of the cellular phone 10(b).

That is, (overview) is displayed as the state information in the Subject (title) 11a, and the details for the overview of "xxx Co., Ltd." are displayed in the text 11b.

When a continuation of the overview is to be obtained, in accordance with an instruction "Please select reply to display a continuation", an email is sent for which the text 11b is blank (c). Then, the keyword extraction function analyzes the contents of the text 11b and the Subject (title) 11a of the email, and extracts a keyword. In this case, only "overview" in the Subject (title) 11a is extracted as a keyword.

Thereafter, the acquisition function obtains a continuation of "overview" from the information DB 30, and the reply email generation function creates an email. In this case, the email replying function transmits the continuation for "overview" obtained from the information DB 30, and the continuation for "overview" is displayed on the screen of the cellular phone 10(d).

That is, (Re2: overview) is displayed as state information in the Subject (title) 11a, and the continuation of the overview for "xxx Co., Ltd." is displayed in the text 11b.

As described above, in this embodiment, folders are correlated with IDs, and are hierarchically managed in accordance with the correlated IDs; upon receiving an access email from the cellular phone 10, the folder names correlated with the IDs are examined, and a reply email that includes a folder name included in a first rank and a folder name included in a second rank immediately below the folder name is generated; the reply email is transmitted to the cellular phone 10 at an accessing source; upon receiving an access email from the cellular phone 10, it is determined whether the email includes the folder name in the second rank that is included in the reply email; when it is determined that the email includes the folder name, the folder names correlated with the IDs are examined, and a reply email that includes a folder name in the second rank and a folder name in a third rank immediately below the folder name is generated; and the reply email is transmitted to the cellular phone 10 at the access source. With this arrangement, necessary information can be easily obtained at an arbitrary time.

Further, in this embodiment, since the keyword extraction function analyzes the Subject (title) 11a and the contents of the text 11b of the email sent from the cellular phone 10 and extracts a keyword, a user need only enter a simple keyword, such as a number, to request desired information.

Furthermore, in this embodiment, since the keyword extraction function extracts a keyword by examining a keyword extraction table (not shown) or by executing a program that includes predetermined keywords, not only can a search request from a user be accepted, but also a search for the request can be performed by employing simple procedures.

In addition, in this embodiment, since the designation function determines a query based on a keyword extracted by the keyword extraction function and performs a process corresponding to the query, the type of the following search request issued by a user can be correctly determined.

Moreover, in this embodiment, since, based on an address or a file path that is correlated with a keyword extracted by the keyword extraction function, the designation function designates a location whereat information is to be obtained, various types of information stored in the hierarchical structure in the information DB 30 can be easily and accurately searched for.

Furthermore, in this embodiment, the reply email generation function enters information obtained by the acquisition function as an email form in the text of the email, and enters information, designated by the designation function, that indicates a location whereat information is to be obtained, as state information in the Subject (title) of the email. As a result, for a user, the input operations required to request desired information can be considerably reduced.

In this case, when the reply email generation function enters not only the search results as the email form in the text 11b, but also an email address, a URL and a phone number for obtaining various information, the user need only click on the email address, the URL or the phone address displayed on the cellular phone 10. Thus, only a simple operation is required for various actions, relative to received information, to be immediately performed.

As described above, since for a user the input operations required to request desired information is considerably reduced, the most appropriate email information service can be provided for a cellular phone, for which the number and the sizes of the input keys are limited, compared with a common PC (personal computer), because of the reduction in the size and in the weight.

The present invention can also be applied for a general communication system for other terminal devices having an email function.

What is claimed is:

1. An email information providing server, for providing various types of information services using the email function of a portable terminal, comprising:

an information storage unit, for correlating, with IDs, folders and hierarchically managing the folders in accordance with the IDs that are correlated;

a first email generator, for, upon receiving an access email from the portable terminal, examining the folder names correlated with the IDs stored in the information storage unit and generating a reply email that includes a folder name included in a first rank and a folder name included in a second rank immediately below the folder name;

a first reply unit, for transmitting the reply email generated by the first email generator to the portable terminal at an accessing source;

a determination unit, for, upon receiving an access email from the portable terminal, determining whether the access email includes the folder name in the second rank that is included in the reply email transmitted by the first reply unit;

a second email generator, for, when the determination unit determines that the access email includes the folder name, examining the folder names correlated with the IDs stored in the information storage unit and generating a reply email that includes a folder name in the second rank and a folder name in a third rank immediately below the folder name; and a second reply unit for transmitting the reply email generated by the second email generator to the portable terminal at the access source.

2. An email information providing server as set forth in claim 1, wherein, in the access email transmitted by the portable terminal, a folder name in a higher rank is displayed as a title, and a rank lower than the higher rank is displayed in the text.

3. An email information providing system, for providing various types of information services using the email function of a portable terminal, comprising:

a portable terminal; and an email information providing server including an information storage unit, for correlating, with IDs, folders and hierarchically managing the folders in accordance with the IDs that are correlated, a first email generator, for, upon receiving an access email from the portable terminal, examining the folder names correlated with the IDs stored in the information storage unit and generating a reply email that includes a folder name included in a first rank and a folder name included in a second rank immediately below the folder name, a first reply unit, for transmitting the reply email generated by the first email generator to the portable terminal at an accessing source, a determination unit, for, upon receiving an access email from the portable terminal, determining whether the access email includes the folder name in the second rank that is included in the reply email transmitted by the first reply unit, a second email generator, for, when the determination unit determines that the access email includes the folder name, examining the folder names correlated with the IDS stored in the information storage unit and generating a reply email that includes a folder name in the second rank and a folder name in a third rank immediately below the folder name, and a second reply unit for transmitting the reply email generated by the second email generator to the portable terminal at the access source.

4. An email information providing system as set forth in claim 3, wherein, in the access email transmitted by the portable terminal, a folder name in a higher rank is displayed as a title, and a rank lower than the higher rank is displayed in the text.

5. An email information providing method, for providing various types of information services using the email function of a portable terminal, comprising:

correlating, with IDs, folder names that indicate directories and hierarchically managing the folder names in accordance with the IDs that are correlated;

upon receiving an access email from the portable terminal, examining the folder names correlated with the IDs and generating a reply email that includes a folder name included in a first rank and a folder name included in a second rank immediately below the folder name;

transmitting the reply email to the portable terminal at an accessing source;

upon receiving an access email from the portable terminal, determining whether the access email includes the folder name in the second rank that is included in the reply email;

when it is determined that the access email includes the folder name, examining the folder names correlated with the IDs and generating a reply email that includes a folder name in the second rank and a folder name in a third rank immediately below the folder name; and transmitting the reply email to the portable terminal at the access source.

6. An email information providing method as set forth in claim 5, whereby, in the access email transmitted by the portable terminal, a folder name in a higher rank is displayed as a title, and a rank lower than the higher rank is displayed in the text.

7. An email information providing program, for executing an email information providing method for providing various types of information services using the email function of a portable terminal, comprising:

correlating, with IDs, folders and hierarchically managing the folders in accordance with the IDs that are correlated;

upon receiving an access email from the portable terminal, examining the folder names correlated with the IDs and generating a reply email that includes a folder name included in a first rank and a folder name included in a second rank immediately below the folder name;

transmitting the reply email to the portable terminal at an accessing source;

upon receiving an access email from the portable terminal, determining whether the access email includes the folder name in the second rank that is included in the reply email;

when it is determined that the access email includes the folder name, examining the folder names correlated with the IDs and generating a reply email that includes a folder name in the second rank and a folder name in a third rank immediately below the folder name; and transmitting the reply email to the portable terminal at the access source.

8. An email information providing program as set forth in claim 7, whereby, in the access email transmitted by the portable terminal, a folder name in a higher rank is displayed as a title, and a rank lower than the higher rank is displayed in the text.

* * * * *